1,879,396

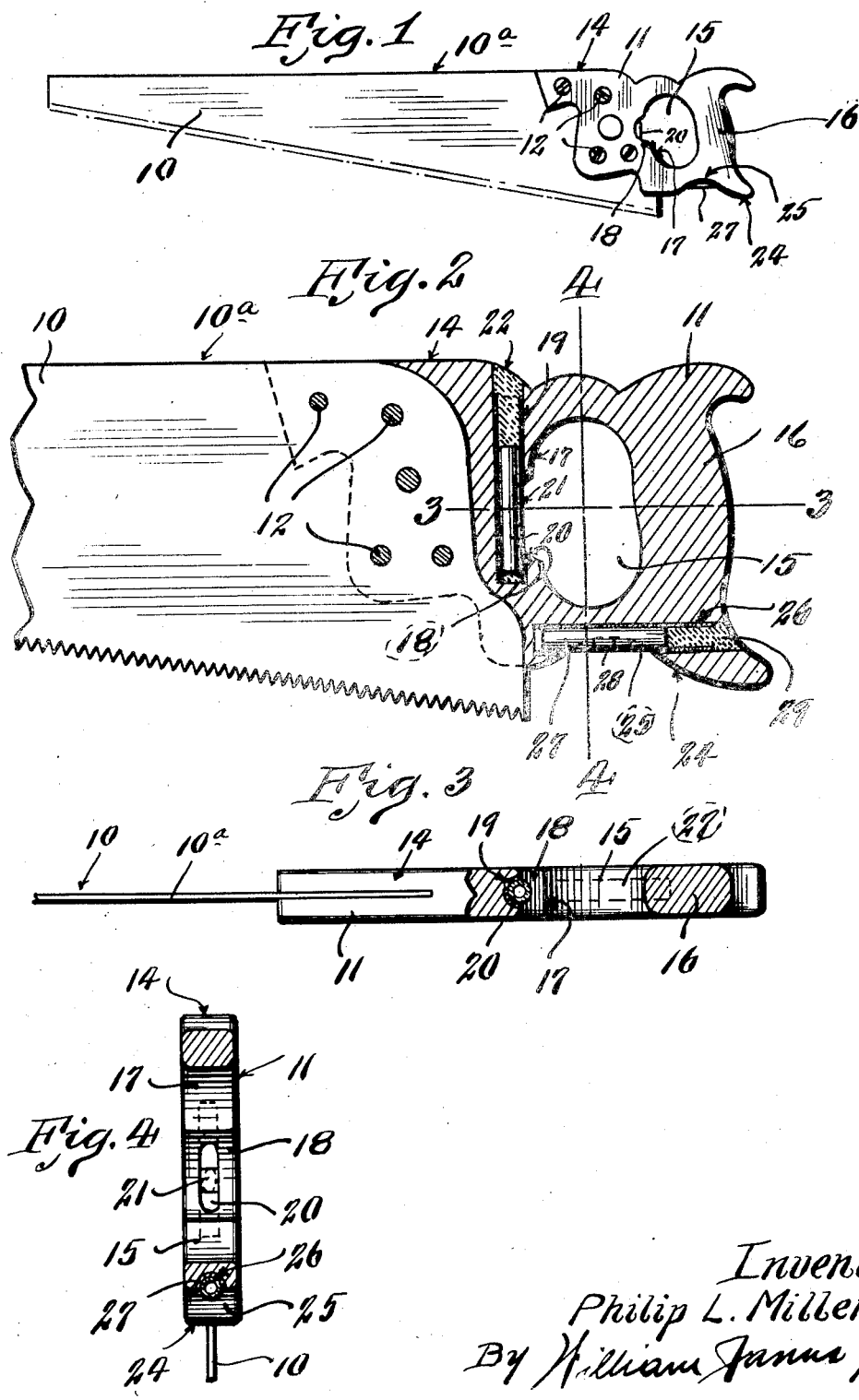
Sept. 27, 1932. P. L. MILLER 1,879,396
COMBINED PLUMB AND LEVEL SAW HANDLE
Filed June 30, 1930
Inventor
Philip L. Miller Patented Sept. 27, 1932

UNITED STATES PATENT OFFICE

PHILIP L. MILLER, OF FLORISSANT, MISSOURI

COMBINED PLUMB AND LEVEL SAW HANDLE

Application filed June 30, 1930. Serial No. 464,774.

This invention relates to new and useful improvements in hand saws and more particularly to handles for same.

The objects of the invention are to provide a hand saw, the handle of which is provided with two liquid levels so arranged that the back of the saw can be used in leveling and plumbing operations.

Further objects of the invention are to provide a hand saw having a handle provided with two depressions or concave portions arranged at right angles to each other and containing suitable liquid levels disposed in cooperative relation with the back or straight edge of the saw blade whereby said straight edge can be used in determining the plumb or the level of a surface.

Additional objects of the invention are to provide a saw handle adapted to have secured thereto a saw blade and having portions shaped to form depressions adapted to receive liquid levels so that the latter are protected against injury, said handle being provided with bores arranged to intersect said depressions and adapted to receive the liquid levels, whereby the central or marked portion of each level is rendered visible through said depression.

With these and other objects in view, my invention consists in certain novel features of construction and arrangement of parts, hereinafter more fully described and claimed, and illustrated in the accompanying drawing, in which—

Figure 1 is an elevational view of my improved saw.

Figure 2 is an enlarged elevation of the handle and a fragmental portion of the saw blade, the handle being partially in cross section to illustrate my invention.

Figure 3 is a horizontal cross section taken on line 3—3 of Figure 2.

Figure 4 is a vertical cross section taken on line 4—4 of Figure 2.

The purpose of the invention is to attach to the handle of a saw, two liquid levels so arranged that the back or straight edge of the saw blade can be used as a level, one of the liquid levels or tubes being used in reading the plumb line and the other liquid level or tube being used in reading the level line. The liquid levels or tubes are arranged in bores formed in the handle and intersect suitable depressions or recesses whereby the central portion of each level is exposed and can be easily read and at the same time the liquid level is prevented from coming in contact with other objects, thereby being protected against injury.

Referring by numerals to the accompanying drawing, 10 indicates a saw blade and 11 a handle for the same. The handle is secured to the blade by suitable fastening devices, such as screws 12. The blade 10 has the back edge formed straight and substantially flush with the upper edge 14 of handle 11. The handle is provided with an opening 15 and a grip 16 so shaped that when the grip 16 is in the palm of the hand, opening 15 accommodates the fingers encircling grip piece 16.

The inner wall 17 forming opening 15 is provided at a point, preferably opposed to the hand grip 16, with a concave or depressed portion 18. The handle is bored vertically as indicated at 19 from the upper end of said handle and said bore intersects depression 18. A liquid level 20 is inserted in said bore so that its bubble mark 21 is exposed and clearly visible in said depression 18. The bore is then filled with suitable cement or filler so as to hold the liquid level in position, and the end of the bore is then sealed as indicated at 22. Bore 19 and liquid tube 20 are disposed at right angle to the back $10^a$ of saw blade 10 so that when said back or straight edge $10^a$ occupies vertical position the liquid level 20 occupies a horizontal position with the indicating bubble arranged within the mark 21.

The lower edge 24 of the handle is suitably shaped and is provided with concave or upwardly curved portion 25, preferably disposed immediately below the opening 15. A bore 26 is formed in the lower part of said handle parallel with the straight edge $10^a$ and intersecting the depressed portion 25. A liquid level or tube 27 is inserted in bore 26 and is arranged with the bubble mark 28 presented outwardly in depression 25 so that said mark can be easily read. The liquid level or tube 27 is secured in position in any suitable manner and the outer end of the bore 26 opening outwardly through the rear edge of the handle is sealed as indicated at 29.

When the saw is used to measure a horizontally disposed surface, the saw is reversed with the straight edge 10ª resting on the surface and with liquid level 27 presented upwardly. As said liquid level is arranged in parallelism with the back 10ª, the level condition of the surface will be indicated by the bubble occupying position within the bubble marks 28. As the exposed portion of the glass tube or level 27 is arranged within the depression 25, said glass tube is prevented from coming in contact or being forcibly thrown against falling objects and is thus protected against injury.

The location of the levels or glass tubes is such that they do not interfere with the ordinary use of the saw and do not impair the hand-hold on the saw as the surface or shape of the grip piece 16 is not affected and said glass tubes are out of the way of the fingers or the palm of the user's hand.

The spirit or liquid levels or tubes are secured in position in the respective bores, preferably by a wood wax which is also used to seal the outer ends of the bores.

While I have shown the preferred form of my saw handle, it is obvious that various changes in the handle and the arrangement of the liquid levels can be made and substituted for those herein disclosed without departing from the spirit of my invention.

I claim:

In a hand saw, the combination with a saw blade having a straight back, of a handle secured to said blade and having an opening formed therein to provide a suitable grip-piece, the wall of said opening opposite to said grip-piece being provided with a curved notch, there being a bore formed in said handle at right angle to said straight back of said saw, said bore extending from the upper edge of said handle inwardly adjacent to the lower edge thereof and intersecting said notch, a metallic tubular member driven into said bore through the open end thereof, said tubular member being substantially coextensive with said bore and provided with a cut-away portion coinciding with said notch, a liquid level arranged in said tubular member and partially exposed through said notch and said cut-away portion whereby the bubble mark is rendered visible, said handle being provided in its lower edge with an inwardly curved portion, there being a bore formed in the lower edge of said handle in parallelism with said straight back of said saw blade, said bore intersecting said curved portion, a metallic tubular member driven into said bore through the upper end thereof and having a cut-away portion coinciding with said curved portion, and a liquid level arranged in said tubular member and partially exposed through said curved portion and said cut-away portion whereby the bubble mark of said level is rendered visible, said levels being disposed below the planes of the adjacent surfaces to protect them against injury and said tubular members forming reinforcements for said handle.

In testimony whereof I hereunto affix my signature this 26th day of June, 1930.

PHILIP L. MILLER.